Feb. 27, 1968 H. G. BLANK ET AL 3,371,230

SWITCHING CIRCUITS

Filed June 29, 1964 4 Sheets-Sheet 1

INVENTORS.
HANS G. BLANK
MARTIN FISCHMAN

BY

R. J. Frank
ATTORNEY

Feb. 27, 1968 H. G. BLANK ET AL 3,371,230

SWITCHING CIRCUITS

Filed June 29, 1964 4 Sheets-Sheet 2

INVENTORS.
HANS G. BLANK
MARTIN FISCHMAN

BY R. J. Frank

ATTORNEY.

SWITCHING CIRCUITS

Filed June 29, 1964 4 Sheets-Sheet 3

INVENTORS.
HANS G. BLANK
MARTIN FISCHMAN
BY
R. J. Frank
ATTORNEY.

SWITCHING CIRCUITS

Filed June 29, 1964

INVENTORS.
HANS G. BLANK
MARTIN FISCHMAN

BY R. J. Frank
ATTORNEY.

United States Patent Office 3,371,230

Patented Feb. 27, 1968

3,371,230

SWITCHING CIRCUITS

Hans G. Blank, Bronx, and Martin Fischman, Wantagh, N.Y., assignors to General Telephone and Electronics Laboratories, Inc., a corporation of Delaware Filed June 29, 1964, Ser. No. 378,639

13 Claims. (Cl. 307—284)

ABSTRACT OF THE DISCLOSURE

A switching circuit for controlling a high impedance load, such as an electroluminescent lamp, in which a silicon controlled rectifier (SCR) is connected in series with the load. The load is maintained in either an energized or deenergized state by application of an input signal of short duration to a bistable circuit which controls the conductivity of the SCR. The high impedance of the load compared to the relatively low impedance of the SCR prevents the SCR from entering its avalanche mode during conduction.

This invention relates to switching circuits and in particular to switching circuits for controlling electroluminescent light sources.

Electroluminescent light sources are ideally suited for incorporation in large display devices of the type employed in the operation of complex apparatus such as aircraft traffic control systems or automated factories. These display devices comprise individual electroluminescent lamps positioned in a predetermined pattern, each lamp being arranged to respond to an applied input signal. As the input signals change, the lamps are selectively turned on and off causing the patterns of words, numbers or pictures appearing on the surface of the display to vary in a manner corresponding to the input signals. This pattern is used by the operator as a basis for adjusting or making corrections in the controlled system.

A display system employing large numbers of electroluminescent lamps should ideally be capable of rapid and selective activation or deactivation of each lamp. In addition, once a lamp is lit, it should remain lit with undiminished brightness until it is switched off. Stated another way, the system should combine rapid access time with indefinite storage of information.

Various attempts have been made to achieve such display devices, including the use of bistable circuits employing electroluminescent lamps in combination with photoconductive cells or ferroelectric capacitors. However, bistable circuits employing electroluminescent and photoconductive components require several milliseconds to energize a selected electroluminescent lamp and, in addition, selective erasure is difficult to attain. Circuits using ferroelectric capacitors provide somewhat faster access time but the signals must be continually reapplied to keep the lamps lit.

Accordingly, it is an object of my invention to provide a switching circut for use in conjunction with an electroluminescent display panel which permits each electroluminescent lamp to be rapidly activated or deactivated and which is capable of indefinite storage of information.

Another object of the invention is to provide a switching circuit for controlling an array of electroluminescent lamps so that direct access may be gained to any lamp in the array.

Still another object of the present invention is to provide a circuit capable of rapidly controlling an electroluminescent lamp by the use of relatively low control voltages.

A further object of the invention is to provide a switching circuit capable of maintaining an electroluminescent lamp fully energized for an indefinite period of time.

Yet another object of the present invention is to provide a switching circuit for the control of a high impedance load element.

In accordance with the present invention, there is provided a switching circuit comprising a first semiconductor element having four successive zones of opposite conductivity type materials. The outer zones are defined as the anode and cathode respectively and the intermediate zone adjacent the cathode is called the gate. A high-impedance load element is coupled in series with the anode-cathode circuit of the first semiconductor element and with an alternating voltage source. The conductivity of the first semiconductor element is controlled by a bistable storage control means having first and second input terminals, a direct voltage supply terminal, and first and second output terminals, the first and second output terminals being coupled to the cathode and gate respectively of the first semiconductor element. The storage control means enables the load to be maintained in either an energized or deenergized state for an indefinite period until its state is changed by application of an input signal of short duration.

In one embodiment of our invention, the first semiconductor element is a type PNPN silicon controlled rectifier, the anode and gate zones being P type and the cathode being N-type. The load element is selected to have a high impedance as compared to the impedance between the anode and cathode of the silicon controlled rectifier (hereinafter termed SCR) when it is conducting in the low-current level, non-avalanche state. That is, the impedance of the load element should be at least ten times the low-current level, non-avalanche state conductive anode-to-cathode impedance of the silicon controlled rectifier and may, for example, be an electroluminescent lamp.

The SCR, which is a well known commercially available device, exhibits a relatively small anode-to-cathode current when the current flowing into its gate is small but is driven into an "avalanche" state whenever its gate current is increased above and predetermined value and the anode-to-cathode current has a sufficiently large value. This change in state occurs when the applied electric field and gate currents are sufficient to cause the electrons to gain more energy between collisions than they lose to the lattice during the collisions. As a result, hole-electron pairs are generated thermally producing an avalanche of secondary electrons and holes through the material. Under these conditions, a large current flows between anode and cathode until the SCR is cut off by application of a negative signal to its gate.

The storage control means comprises a second semiconductor element (which may also be a four layer SCR) having its anode coupled to the second output terminal of the storage means, its cathode to the first output and second input terminals and its gate to the first input terminal. A resistor is coupled between the second output terminal and the DC supply terminal and a DC voltage source is connected between the DC supply and second input terminals of the storage means. As shall be explained hereinafter, the first and second SCR's may be similar in design but their mode of operation is quite different.

When the alternating and direct voltage sources are connected to the circuit but no signal is applied to the gate of the second SCR, the first SCR is driven into conduction by the current flowing into its gate from the DC source. Since the impedance of the electroluminescent lamp is high, the current through the first SCR increases but does not enter the high conduction or avalanche state. The current is of sufficient magnitude however to energize the high impedance electroluminescent lamp and causes it to emit light. The voltage across the SCR for low values of anode current is very small for either polarity of alternating voltage and therefore substantially the full supply voltage appears across the electroluminescent lamp during the entire cycle.

If current is now caused to flow into the gate of the second SCR by the application of an input signal thereto, the impedance between the anode and cathode of the second SCR is decreased to a very low value thereby short circuiting the gate-to-cathode circuit of the first SCR. As a result, the first SCR stops conducting, the electroluminescent lamp is deenergized and no longer emits light. It shall be noted that the impedance in series with the second SCR is low and therefore, unlike the first SCR, it enters the avalanche state and conducts heavily when current flows into the gate. The gate current to the second SCR may now be interrupted but the state of the circuit will remain unchanged.

In other embodiments of the invention, the first SCR is controlled by modifications of the storage control switch described above. For example, as will be explained hereinafter, the second SCR may be arranged in series with the first SCR thereby preventing power dissipation while the electroluminescent lamp is off. Also, a four layer diode may be used as the semi-conductor element in the storage switch for certain applications.

The above objects of and the brief introduction to the present invention will be more fully understood and further objects and advantages will become apparent from a study of the following description in connection with the drawings, wherein.

Figure 1:
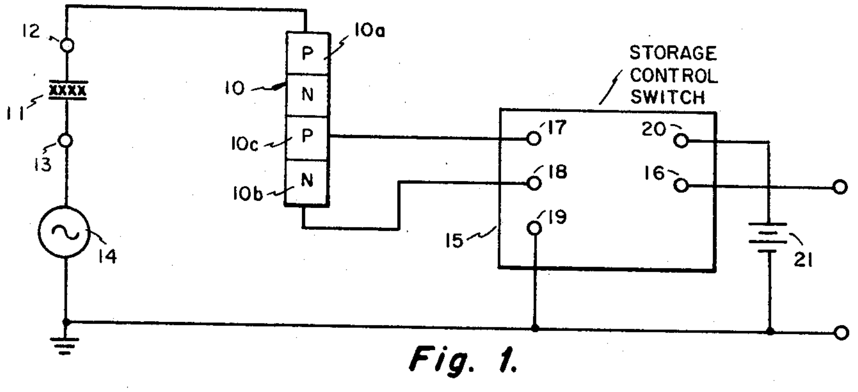
FIG. 1 is a schematic diagram illustrating the basic circuit of the invention.

Referring to FIG. 1, there is shown a silicon controlled rectifier (SCR) 10 having four successive zones of opposite conductivity type material. The outer P-type region 10*a* is defined as the anode, the N-type region 10*b* as the cathode and the P-type region 10*c* adjacent the cathode as the gate. An electroluminescent lamp 11 is provided with one terminal 12 connected to the anode 10*a* of SCR 10 and a second terminal 13 coupled to one terminal of a source of alternating voltage 14. The impedance of this lamp is about one megohm at 400 cycles per second as compared to the conducting and non-conducting impedances of SCR 10 which are approximately 1000 ohms and 20 megohms respectively. A storage control switch 15 provided with first and second input terminals 16 and 19, a direct voltage supply terminal 20, and two output terminals 17 and 18, controls the electroluminescent lamp 11 in accordance with signals applied between the input terminals.

Figure 2:
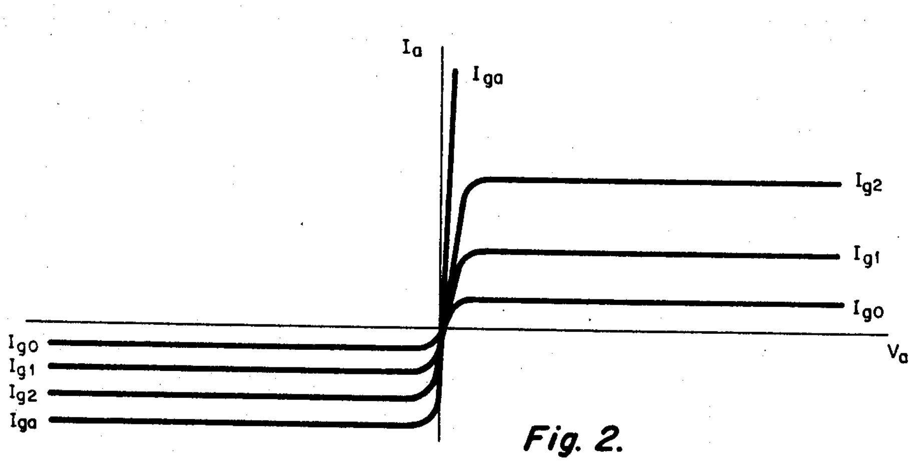
FIG. 2 shows the current-voltage characteristic of a typical silicon controlled rectifier.

The operation of this circuit is best understood by first referring to FIG. 2 which shows current-voltage characteristic curves for a typical SCR. $I_a$ represents the current flowing in the anode of the SCR when a voltage $V_a$ is applied between anode and cathode and $I_g$ is the current flowing into the gate of the device. The curve labeled $I_{g0}$ represents the current-voltage characteristic when zero current flows into the gate and the curves designated $I_{g1}$ and $I_{a2}$ show the relationship between $V_a$ and $I_a$ when a relatively small gate current is flowing. The anode current $I_a$ is low (on the order of 10 to 200 microamperes) when gate currents $I_{g0}$ to $I_{g2}$ are flowing. However, when a gate current of sufficient magnitude $I_{ga}$ is caused to flow, an avalanche breakdown occurs within the SCR and the anode current is increased by several orders of magnitude. Also, the anode-to-cathode impedance decreases to a relatively low value and this relatively low impedance state is maintained even if the gate current is reduced to zero. The mode of operation described in which the SCR is driven into its avalanche state is conventional for circuits employing SCR elements.

Figure 3:
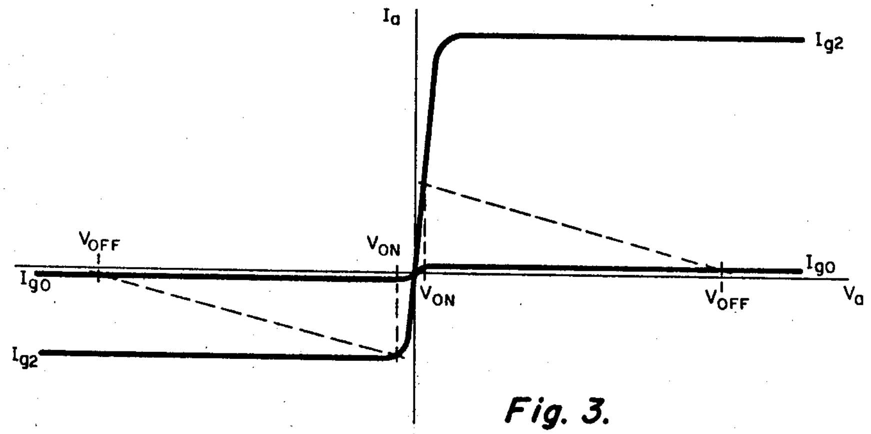
FIG. 3 is an enlarged view of a portion of the characteristics of FIG. 2.

In the case of the circuit of FIG. 1, the operation of SCR 10 is different from the above described conventional mode of operation because the electroluminescent lamp 11 has too high an impedance to allow the avalanche state to be reached. Accordingly, operation is over the region shown in FIG. 3.

The operation of the circuit of FIG. 1 may be best understood by assuming that the circuit has been connected to A-C supply 14 and D-C voltage source 21 but that no input signal has been applied across input terminals 16 and 19. Under these conditions, there is zero gate current (indicated by $I_{g0}$ in FIG. 3) and the anode current is small. The alternating voltage across SCR 10 swings between the positive and negative values $V_{OFF}$ resulting in a negligible voltage appearing across electroluminescent lamp 11 which remains off. If now a current $I_{g2}$ flows into gate 10*c*, the voltage $V_a$ is reduced to a peak magnitude $\pm V_{ON}$. Accordingly, most of the voltage generated by alternating voltage source 14 now appears across the electroluminescent lamp 11 and the lamp emits light. (As will be explained in connection with the detailed description of the storage control switch 15, lamp 11 is energized when the impedance between terminals 18 and 19 is very small.) Since SCR 10 does not enter the avalanche state, removal of the gate current causes its impedance to increase turning the lamp off. Thus, lamp 11 can be switched between its on and off states by changing the gate current from $I_{g0}$ to $I_{g2}$ regardless of the instantaneous polarity of the voltage source 14. Although the characteristic curves are not symmetrical about $V_a=0$, the voltage drop across SCR 10 in each direction is small compared to the total applied voltage and consequently, the A-C voltage across lamp 11 is essentially undistorted.

Various embodiments of the storage switch 15 are shown in FIGS. 4, 5, 8 and 9. Elements which are shown in more than one figure bear the same legend in each figure in which they appear.

Figure 4:
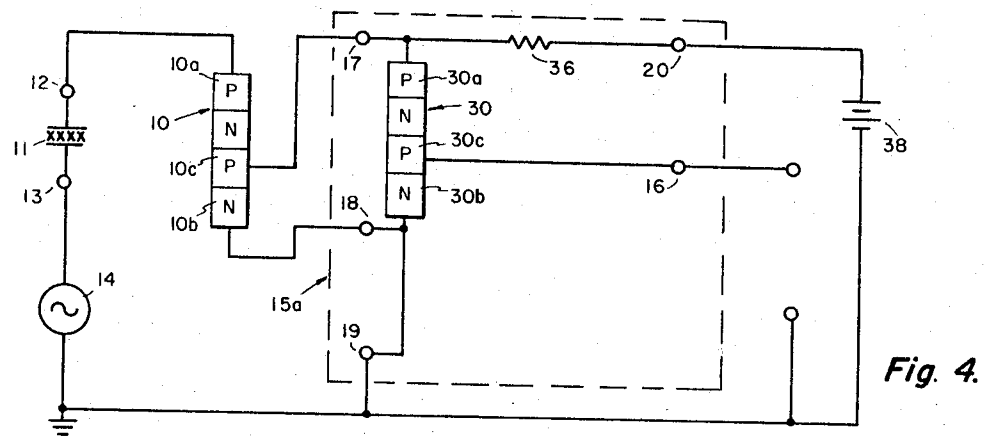
FIG. 4 is a schematic diagram of a circuit constructed in accordance with the invention.

In FIG. 4, switch 15*a* includes an SCR 30 having a gate 30*c* connected to input terminal 16; a cathode 30*b* connected to terminals 18 and 19; and an anode 30*a* connected to switch output terminal 17. Also, anode 30*a* is coupled through a resistor 36 and terminal 20 to a source of direct voltage 38. SCR 30 is turned on and off by positive and negative control pulses respectively applied to its gate 30*c*. Unlike SCR 10, the impedance in series with SCR 30 is relatively low and therefore the current flowing into gate 30*c* produces an avalanche condition corresponding to that indicated for gate current $I_{ga}$ in FIG. 2. Accordingly, SCR 30 is turned on by a single short duration positive pulse and remains on until a negative pulse is applied.

When a negative control pulse is applied between input terminals 16 and 19, current flows out of the gate 30*c* of SCR 30 causing it to substantially cease conduction between its anode and cathode. Consequently, the potential at anode 30$a$ begins to rise but is limited by the gate-to-cathode forward voltage drop of SCR 10. This results in current flowing into gate 10$c$ turning SCR 10 on. A current path is now provided from the positive terminal of source 38, through resistor 36, gate 10$c$ to cathode 10$b$, and back to the negative terminal of source 38.

The voltage drop from gate 10$c$ to cathode 10$b$ is on the order of one or two volts. For example, if the voltage generated by source 38 is 10 volts, resistor 36 is 8000 ohms and SCR 10 is a type 2N1597; a typical drop from gate-to-cathode of SCR 10 would be 2 volts and a gate current of 1.0 milliampere would flow. This current is sufficient to hold SCR 10 in the on condition thereby energizing lamp 11.

When a positive pulse is applied to input terminal 16 (i.e. terminal 16 is made positive with respect to grounded terminal 19), SCR 30 is driven into the avalanche state and begins conducting. The current now flows from source 38 through resistor 36, anode 30$a$ to cathode 30$b$, and back to source 38. Accordingly, SCR 30 short circuits the gate-to-cathode circuit of SCR 10 and, since no current flows in the gate-to-cathode circuit of SCR 10, it stops conducting thereby switching lamp 11 off. The cycle is then repeated for the next control pulse.

Figure 5:
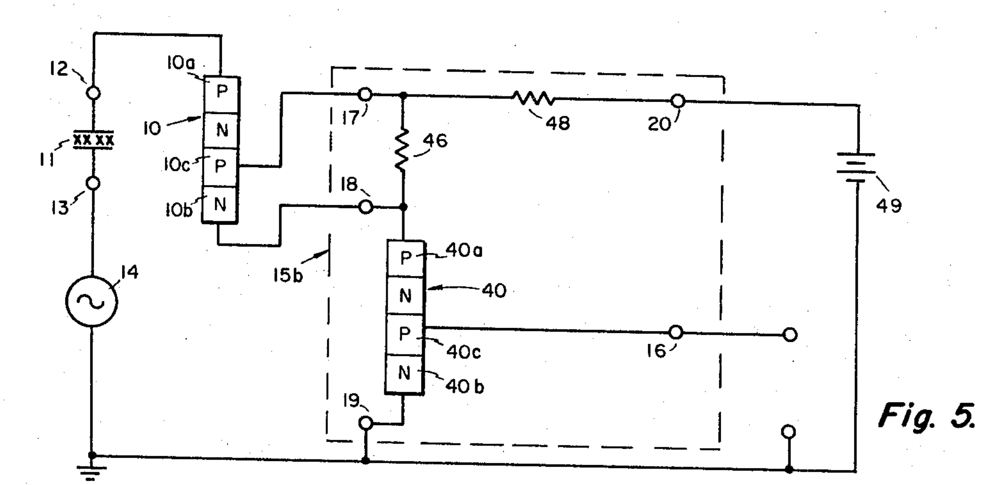
FIG. 5 is a schematic diagram of an alternative embodiment of the invention.

In the circuit of FIG. 4, current is drawn continuously from battery 38. Since in many applications the lamp may be on for only a small percentage of the time, it is desirable to provide a storage control switch that will draw current only when lamp 11 is lit. Such a circuit is shown in FIG. 5. Referring to that figure, switch 15$b$ is shown having an SCR 40 with its anode-to-cathode circuit connected in series with SCR 10 through terminals 18 and 19. SCR 40 is provided with a gate 40$c$ connected to switch input terminal 16; a cathode 40$b$ connected to input terminal 19 and an anode 40$a$ connected to cathode 10$b$ through terminal 18. A first resistor 46 is connected across terminals 17 and 18 to prevent the anode-to-gate leakage current from forward biasing SCR 10 thereby causing it to conduct without an externally applied signal. A second resistor 48 is connected between terminal 17 and a direct voltage source 49. The values of the resistor 48 and the voltage of source 49 are chosen so that when SCR 40 is switched to its low impedance state, sufficient current will flow into the gate of SCR 10 to cause its impedance to decrease enough to switch lamp 11 on.

When a positive control pulse is applied to input terminal 16, SCR 40 conducts heavily and current initially flows from source 49, through resistor 48, gate 10$c$, cathode 10$b$, anode 40$a$, cathode 40$b$ and back to voltage source 49. The resistance of resistor 46 is high compared with the gate-to-cathode resistance so that almost no current from voltage source 49 flows through resistor 46 in this state. Thus, both SCR 10 and 40 are conducting and the voltage across lamp 11 is of sufficient magnitude to cause it to emit light.

When a negative control pulse is applied to input terminal 16, SCR 40 is switched off blocking current flow through the gate-to-cathode circuit of SCR 10 causing it to be switched off. Thus, lamp 11 is turned off and kept off and with lamp 11 off, there is no power dissipation in contrast to the circuit of FIG. 4.

Figure 6:
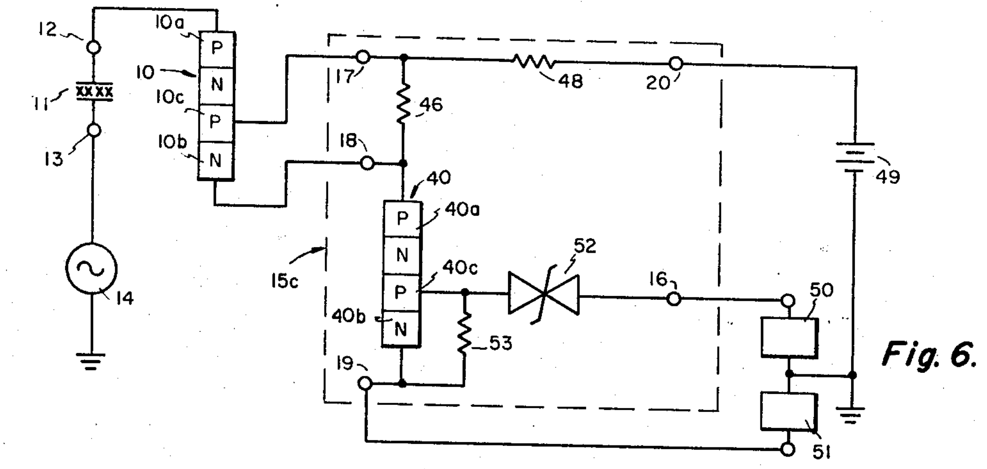
FIG. 6 is a schematic diagram of a modification of the embodiment shown in FIG. 5.

FIG. 6 shows a modification of the circuit shown in FIG. 5 employing a storage control switch 15$c$. The lamp 11 is switched on and off by the coincidence of two control pulses applied between the input terminals 16 and 19 by pulse generators 50 and 51 respectively. A pair of back-to-back Zener diodes 52 are connected in series between input terminal 16 and gate 40$c$ of SCR 40. The pulses produced by generators 50 and 51 are not individually of sufficient magnitude to break down the Zener diodes 52 but the coincidence of two pulses exceeds the Zener voltage. A resistor 53 is connected between the gate and cathode of SCR 40 to prevent any leakage current flowing through diodes 52 from flowing into the gate 40$c$.

To light lamp 11, the control pulse at the output of generator 50 is made positive with respect to ground and the output of generator 51 negative with respect to ground. To extinguish the lamp, the pulse polarities are reversed. The modification applied to the circuit of FIG. 5 and shown in FIG. 6 may also be applied to the circuit shown in FIG. 4.

The circuit of FIG. 6 is especially useful in controlling arrays of electroluminescent lamps. An example of an array in which the present circuit could be used may be found in U.S. Patent 2,995,682 granted Aug. 8, 1961, and assigned to Sylvania Electric Products Inc.

Figure 7:
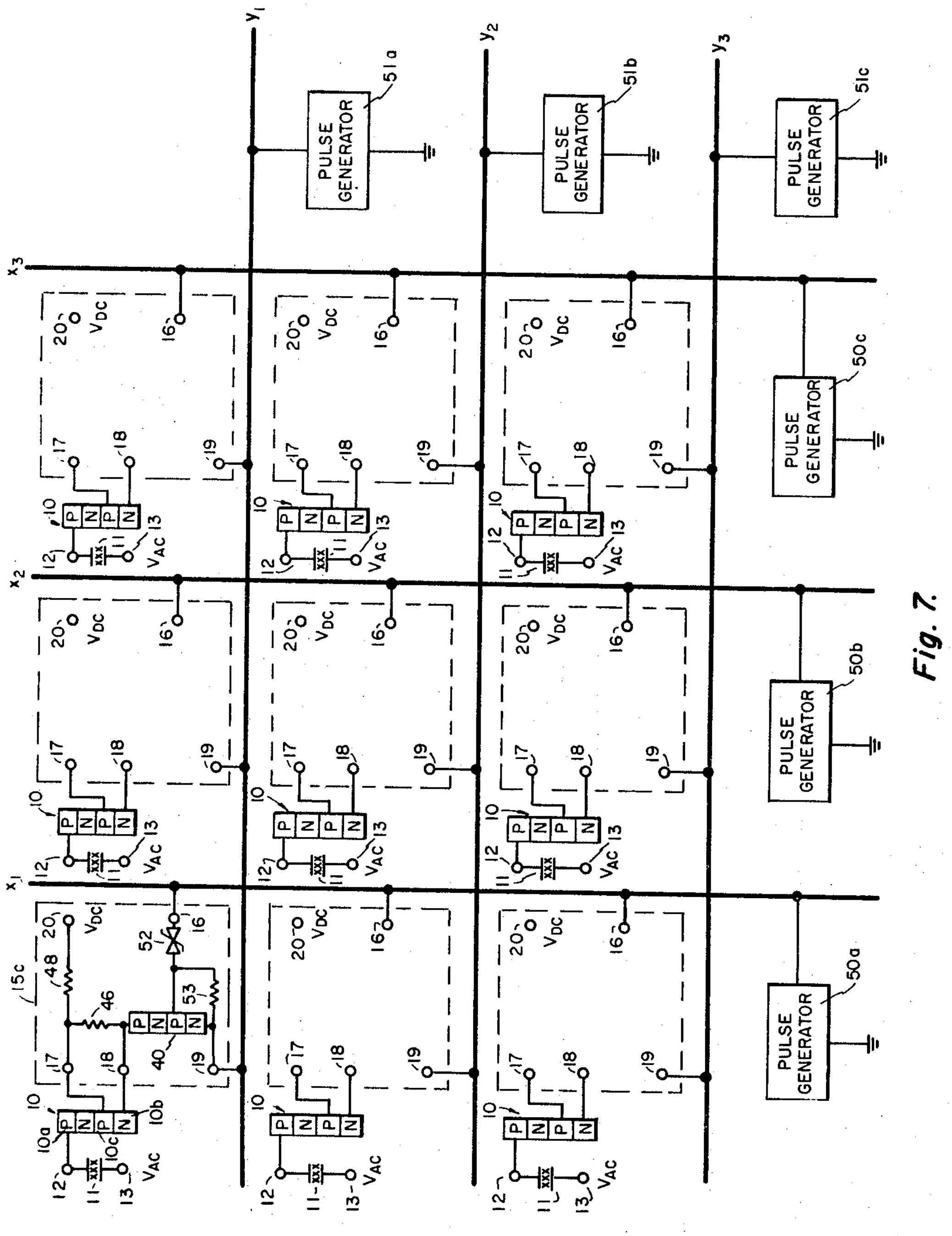
FIG. 7 is a schematic drawing of an array of electroluminescent lamps and switching circuits constructed in accordance with the invention.

FIG. 7 shows a typical two-dimensional, three-column, three-row array, employing the switching circuit of this invention. The switches may be of the type designated 15$c$ in FIG. 6 as shown or of any type constructed in accordance with the invention. The input terminals 16 of each column of switches are connected together and to a corresponding pulse source, terminals in the first column $x_1$ being connected to pulse generator 50$a$, those in the second column $x_2$ to pulse generator 50$b$ and those in the third column $x_3$ to pulse generator 50$c$. Similarly, the rows $Y_1$, $Y_2$, and $Y_3$ are connected to a direct voltage source and to pulse generators 51$a$, 51$b$ and 51$c$ respectively. Pulse generators 50$a$ to 50$c$ and 51$a$ to 51$c$ may be controlled by any suitable circuit which will simultaneously excite the column and row conductors corresponding to a selected electroluminescent lamp.

Figure 8:
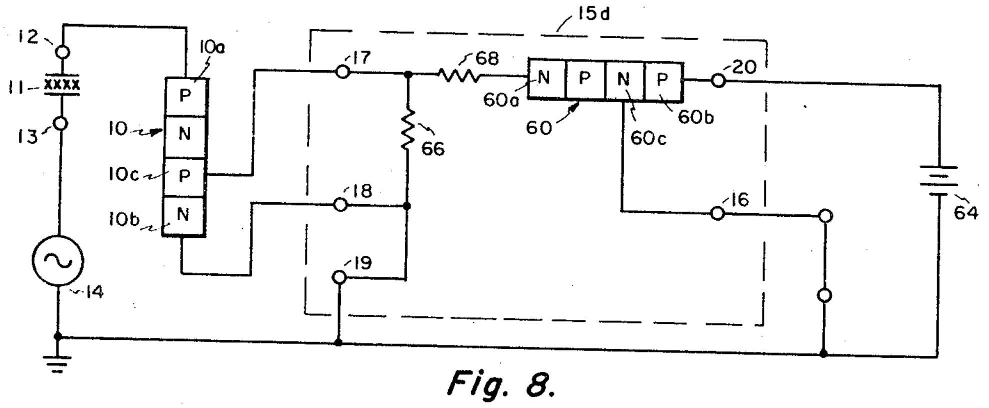
FIG. 8 is a schematic drawing of an alternative embodiment of the invention.

An alternative embodiment of the switch 15 is shown at 15$d$ in FIG. 8. The control element used in this form of the invention is a germanium semiconductor device 60 having a gate 60$c$ made of N-type material rather than P-type as in the case of the silicon controlled rectifier. This element is known commercially under the trade name Dynaquad and is manufactured by Tungsol Electric, Inc. It behaves like a silicon controlled rectifier except that it is turned on by a negative pulse applied between N-type gate 60$c$ and P-type region 60$b$. The P-type region 60$b$ of controlled rectifier 60 is connected to the positive terminal of a D-C source 64, its gate 60$c$ to input terminal 16 to receive the control pulses, and its N-type region 60$a$ connected through a pair of series-connected resistors 68 and 66 to the negative terminal of D-C source 64. Terminal 17, which is connected to the junction of the two resistors is coupled to the gate 10$c$ of SCR 10. The function of resistors 66 and 68 is analogous to the function of resistors 46 and 48 shown in FIG. 5. Resistor 68 limits the current to the gate-cathode circuit of SCR 10 when it is on and resistor 66 prevents SCR 10 from being switched on by its anode-to-gate leakage current. The circuit of FIG. 8 like that of FIG. 5 has the advantage that there is no current dissipation when the lamp is off. The Dynaquad is turned on by a negative control pulse and off by a positive control pulse.

Various embodiments of the circuit have been shown, using silicon controlled rectifier and a germanium rectifier in the storage control switch. Each of these devices has three terminals and four elements or layers of semiconductor material. One further embodiment will be disclosed in which a two-terminal four-layer device is used in the storage control switch.

Figure 9:
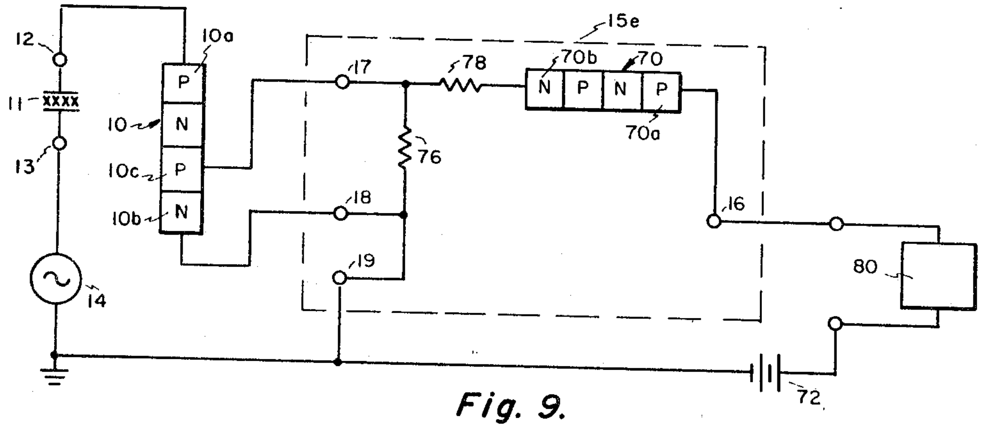
FIG. 9 is a schematic drawing of still another embodiment.

FIG. 9 shows an embodiment of the switch in which a two-terminal four-layer diode 70 is employed. The diode is characterized by a high and a low impedance state and is switched from the high to the low state by applying a voltage from anode 70$a$ to cathode 70$b$ which exceeds a predetermined value called the break-over or threshold voltage. The diode is turned off by reducing the current through it below a predetermined current called the holding current. The anode 70$a$ of diode 70 is connected to a source of direct voltage 72 through a pulse generator 80 and cathode 70$b$ is connected through a pair of resistors 78 and 76 to the negative terminal of DC source 72. Terminal 17, which is connected to the junction of resistors 76 and 78 is coupled to the gate 10c of SCR 10. The function performed by resistors 78 and 76 is analogous to the function performed by resistors 68 and 66 of FIG. 8.

The lamp 11 is lit when a positive control pulse is applied to anode 70a by pulse generator 80. Typically, D-C source 72 has a magnitude of 10 volts and resistors 78 and 76 are 8000 to 10,000 ohms respectively. The threshold voltage of diode 70 is 12 volts. Accordingly, if generator 80 produces a pulse having an amplitude of approximately +8 volts, a voltage of +18 volts (6 in excess of break-over) is impressed across diode 70. To switch diode 70 off, generator 80 provides an output pulse of about −12 volts leaving a voltage of −2 volts across diode 70.

Figure 10:
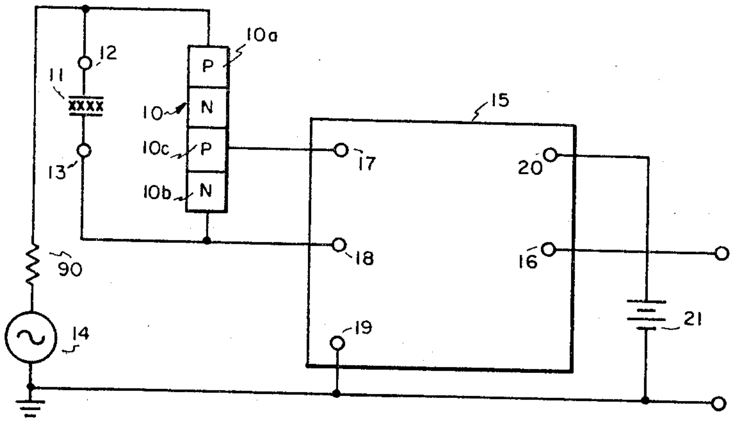
FIG. 10 is a schematic diagram showing a modified version of the basic circuit of the invention.

FIG. 10 shows another version of the basic circuit in which the electroluminescent lamp 11 is connected in parallel with the semiconductor element 10 instead of in series as in FIG. 1. The value of resistor 90 is made sufficiently high to keep SCR 10 from entering the avalanche state.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. A switching circuit comprising (a) a semiconductor element having four successive zones of opposite conductivity types, the outer zones being the anode and cathode respectively and one of the intermediate zones being the gate, (b) a load element having energized and deenergized states coupled in series with the anode-cathode circuit of said semiconductor element and an alternating voltage source, the impedance of said load element being at least ten times the low-current level, non-avalanche state conductive anode-to-cathode impedance of said semiconductor element thereby preventing said semiconductor element from entering its avalanche state during conduction, and (c) bistable control means having first and second states, a first terminal of said control means being coupled to the cathode of said semiconductor element and a second terminal to the gate thereof, said control means causing current to flow in the gate of said semiconductor element when in its first state and to cease flowing when in its second state.

2. The switching circuit defined in claim 1 wherein said semiconductor element is a silicon controlled rectifier and said load element is an electroluminescent lamp.

3. A switching circuit comprising (a) a semiconductor element having four successive zones of opposite conductivity types, the outer zones being the anode and cathode respectively and one of the intermediate zones being the gate, (b) a load element coupled in series with the anode-cathode circuit of said semiconductor element and an alternating voltage source, the impedance of said load element being at least ten times the low-current level, non-avalanche state conductive anode-to-cathode impedance of said semiconductor element thereby preventing said semiconductor element from entering its avalanche state during conduction, and (c) storage control means having first and second output terminals and first and second input terminals, said first and second output terminals being coupled to the cathode and gate respectively of said semiconductor element, said storage control means causing current to flow into the gate of said semiconductor element when a signal having a first polarity is applied across said first and second input terminals and to cease flowing only when a signal having the opposite polarity is applied across said input terminals.

4. A switching circuit comprising (a) a first semiconductor element having four successive zones of opposite conductivity types, the outer zones being the anode and cathode respectively and one of the intermediate zones being the gate, (b) a load element coupled in series with the anode-cathode circuit of said first semiconductor element and an alternating voltage source, the impedance of said load element being at least ten times the low-current level, non-avalanche state conductive anode-to-cathode impedance of said first semiconductor element thereby preventing said first semiconductor element from entering its avalanche state during conduction, and (c) storage control means having first and second output terminals, first and second input terminals and a direct voltage supply terminal, said supply terminal and said second input terminal being adapted for coupling a source of direct voltage therebetween, said first and second output terminals being coupled to the cathode and gate respectively of said first semiconductor element, said storage control means further comprising (1) a second semiconductor element having four successive zones of opposite conductivity types, (2) impedance means coupling the outer zones of said second semiconductor element between said second input and direct voltage supply terminals respectively, (3) means coupling an outer zone of said second semiconductor element to the first output terminal of said storage control means, (4) means coupling said impedance means to the second output terminal of said storage control means, and (5) means coupling said first and second input terminals to adjacent zones of said second semiconductor element, said storage control means causing current to flow into the gate of said first semiconductor element when a signal having a first polarity is applied across said first and second input terminals and to cease flowing only when a signal having the opposite polarity is applied across said input terminals.

5. A switching circuit comprising (a) a first semiconductor element having four successive zones of opposite conductivity types, the outer zones being the anode and cathode respectively and one of the intermediate zones being the gate, (b) a load element coupled in series with the anode-cathode circuit of said first semiconductor element and an alternating voltage source, the impedance of said load element being at least ten times the low-current level, non-avalanche state conductive anode-to cathode impedance of said first semiconductor element thereby preventing said first semiconductor element from entering its avalanche state during conduction, (c) storage control means having first and second output terminals, first and second input terminals and a direct voltage supply terminal, said supply terminal and said second input terminal being adapted for coupling a source of direct voltage therebetween, said first and second output terminals being coupled to the cathode and gate respectively of said first semiconductor element, said storage control means further comprising (1) a second semiconductor element having four successive zones of opposite conductivity types, the outer zones being the anode and cathode respectively and one of the intermediate zones being the gate, (2) resistive means coupling the anode and cathode of said second semiconductor element between said direct voltage supply and second input terminals respectively, (3) means coupling an outer zone of said second semiconductor element to the first output terminal of said storage control means, (4) means coupling said resistive means to the second output terminal of said storage control means, and (5) means coupling the gate and the adjacent outer zone of said second semiconductor element to said first and second input terminals respectively, said storage control means causing current to flow into the gate of said first semiconductor element when a signal having a first polarity is applied across said first and second input terminals and to cease flowing only when a signal having the opposite polarity is applied across said input terminals.

6. A switching circuit comprising (a) a first silicon controlled rectifier having four successive zones of opposite conductivity types, the outer zones being the anode and cathode respectively and one of the intermediate zones being the gate, (b) an electroluminescent lamp, (c) means for coupling said electroluminescent lamp in series with the anode of said first silicon controlled rectifier and one terminal of an alternating voltage source, the impedance of said electroluminescent lamp being at least ten times the low-current level, non-avalanche state conductive anode-to-cathode impedance of said first silicon controlled rectifier thereby preventing said first silicon controlled rectifier from entering its avalanche state during conduction, and (d) storage control means having first and second output terminals, first and second input terminals and a direct voltage supply terminal, said supply terminal and the other terminal of said alternating voltage source being adapted for coupling a source of direct voltage therebetween, said first and second output terminals being coupled to the cathode and gate respectively of said first silicon controlled rectifier and said second input terminal being coupled to the other terminal of said alternating voltage source, said storage control means further comprising (1) a second silicon controlled rectifier having four successive zones of opposite conductivity types, the outer zones being the anode and cathode respectively and one of the intermediate zones being the gate, (2) first and second resistors coupled in series with said second silicon controlled rectifier between said direct voltage supply terminal and said second input terminal, the resistance of said first and second resistors being sufficiently low to permit said second silicon controlled rectifier to enter its avalanche state during conduction, (3) means coupling said first resistor across said first and second output terminals, and (4) means coupling the gate of said second silicon controlled rectifier to said first input terminal, said storage control means causing current to flow into the gate of said first silicon controlled rectifier when a signal having a first polarity is applied across said first and second input terminals and to cease flowing only when a signal having the opposite polarity is applied across said input terminals.

7. A switching circuit comprising (a) a first silicon controlled rectifier having four successive zones of opposite conductivity types, the outer zones being the anode and cathode respectively and one of the intermediate zones being the gate, (b) an electroluminescent lamp, (c) means for coupling said electroluminescent lamp in series with the anode of said first silicon controlled rectifier and one terminal of an alternating voltage source, the impedance of said electroluminescent lamp being at least ten times the low-current level, non-avalanche state conductive anode-to-cathode impedance of said first silicon controlled rectifier thereby preventing said first silicon controlled rectifier from entering its avalanche state during conduction, and (d) storage control means having first and second output terminals, first and second input terminals and a direct voltage supply terminal, said supply terminal and the other terminal of said alternating voltage source being adapted for coupling a source of direct voltage therebetween, said first and second output terminals being coupled to the cathode and gate respectively of said first silicon controlled rectifier and said second input terminal being coupled to the other terminal of said alternating voltage source, said storage control means further comprising (1) a second silicon controlled rectifier having four successive zones of opposite conductivity types, the outer zones being the anode and cathode respectively and one of the intermediate zones being the gate, (2) a resistor coupled in series with said second silicon controlled rectifier between said direct voltage supply terminal and said second input terminal, the resistance of said resistor being sufficiently low to permit said second silicon controlled rectifier to enter its avalanche state during conduction, (3) means coupling the anode and cathode of said second silicon controlled rectifier between said first and second output terminals, and (4) means coupling the gate of said second silicon controlled rectifier to said first input terminal, said storage control means causing current to flow into the gate of said first silicon controlled rectifier when a signal having a first polarity is applied across said first and second input terminals and to cease flowing only when a signal having the opposite polarity is applied across said input terminals.

8. A switching circuit comprising (a) a first silicon controlled rectifier having four successive zones of opposite conductivity types, the outer zones being the anode and cathode respectively and one of the intermediate zones being the gate, (b) an electroluminescent lamp, (c) means for coupling said electroluminescent lamp in series with the anode of said first silicon controlled rectifier and one terminal of an alternating voltage source, the impedance of said electroluminescent lamp being at least ten times the low-current level, non-avalanche state conductive anode-to-cathode impedance of said first silicon controlled rectifier thereby preventing said first silicon controlled rectifier from entering its avalanche state during conduction, (d) storage control means having first and second output terminals, first and second input terminals and a direct voltage supply terminal, said supply terminal and the other terminal of said alternating voltage source being adapted for coupling a source of direct voltage therebetween, said first and second output terminals being coupled to the cathode and gate respectively of said first silicon controlled rectifier, said storage control means further comprising (1) a second silicon controlled rectifier having four successive zones of opposite conductivity types, the outer zones being the anode and cathode respectively and one of the intermediate zones being the gate, (2) first and second resistors coupled in series with said second silicon controlled rectifier between said direct voltage supply terminal and said second input terminal, the resistance of said first and second resistors being sufficiently low to permit said second silicon controlled rectifier to enter its avalanche state during conduction, (3) means coupling said first resistor across said first and second output terminals, and (4) a zener diode coupling the gate of said second silicon controlled rectifier to said first input terminal, and (e) means for coupling first and second pulse generators between said first and second input terminals, the junction of said first and second pulse generators being coupled to the other terminal of said alternating voltage source.

9. A switching circuit comprising (a) a first silicon controlled rectifier having four successive zones of opposite conductivity types, the outer zones being the anode and cathode respectively and one of the intermediate zones being the gate, (b) an electroluminescent lamp having first and second terminals, one of said terminals being connected to the anode of said first silicon controlled rectifier and the other terminal being coupled to one terminal of a source of alternating voltage, the impedance of said electroluminescent lamp being at least ten times the low-current level, non-avalanche state conductive anode-to-cathode impedance of said first silicon controlled rectifier thereby preventing said first silicon controlled rectifier from entering its avalanche state during conduction, and (c) storage control means having first and second output terminals, first and second input terminals and a direct voltage supply terminal, said supply terminal and the other terminal of said alternating voltage source being adapted for coupling a source of direct voltage therebetween, said first and second output terminals being coupled to the cathode and gate respectively of said first silicon controlled rectifier and said second input terminal being coupled to the other terminal of said source of alternating voltage, said storage control means further comprising (1) a second silicon controlled rectifier having four successive zones of opposite conductivity types, the outer zones being the anode and cathode respectively and one of the intermediate zones being the gate, the cathode of said second silicon controlled rectifier being coupled to said second input terminal, (2) first and second series-connected resistors, said first resistor being coupled to the anode of said second silicon controlled rectifier and to the second output terminal of said storage control means and said second resistor being coupled to said direct voltage supply terminal, and (3) means coupling the gate of said second silicon controlled rectifier to said first input terminal, said storage control means causing current to flow into the gate of said first silicon controlled rectifier when a signal having a first polarity is applied across said first and second input terminals and to cease flowing only when a signal having the opposite polarity is applied across said input terminals.

10. A switching circuit comprising (a) a silicon controlled rectifier having four successive zones of opposite conductivity types, the outer zones being the anode and cathode respectively and one of the intermediate zones being the gate, (b) an electroluminescent lamp having first and second terminals, one of said terminals being connected to the anode of said silicon controlled rectifier and the other terminal being coupled to one terminal of a source of alternating voltage, the impedance of said electroluminescent lamp being at least ten times the low-current level, non-avalanche state conductive anode-to-cathode impedance of said silicon controlled rectifier thereby preventing said silicon controlled rectifier from entering its avalanche state during conduction, and (c) storage control means having first and second output terminals, first and second input terminals and a direct voltage supply terminal, said supply terminal and the other terminal of said alternating voltage source being adapted for coupling a source of direct voltage therebetween, said first and second terminals being coupled to the cathode and gate respectively of said silicon controlled rectifier and said second input terminal being coupled to the other terminal of said source of alternating voltage, said storage control means further comprising (1) a semiconductor element having four successive zones of opposite conductivity types, the outer zones being the anode and cathode respectively and one of the intermediate zones being the gate, the anode of said semiconductor element being coupled to said direct voltage supply terminal, (2) first and second series-connected resistors, said second resistor being coupled to the cathode of said semiconductor element and said first resistor being coupled to the first output and second input terminals of said storage control means, the junction between said first and second resistors being coupled to the second output terminal of said storage control means, and (3) means coupling the gate of said semiconductor element to said first input terminal, said storage control means causing current to flow into the gate of said silicon controlled rectifier when a signal having a first polarity is applied across said first and second input terminals and to cease flowing only when a signal having the opposite polarity is applied across said input terminals.

11. A switching circuit comprising (a) a silicon controlled rectifier having four successive zones of opposite conductivity types, the outer zones being the anode and cathode respectively and one of the intermediate zones being the gate, (b) an electroluminescent lamp having first and second terminals, one of said terminals being connected to the anode of said silicon controlled rectifier and the other terminal being coupled to one terminal of a source of alternating voltage, the impedance of said electroluminescent lamp being at least ten times the low-current level, non-avalanche state conductive anode-to-cathode impedance of said silicon controlled rectifier thereby preventing said silicon controlled rectifier from entering its avalanche state during conduction, and (c) storage control means having first and second output terminals and first and second input terminals, said first output terminal being coupled to the cathode of said silicon controlled rectifier and to the other terminal of said source of alternating voltage, said second output terminal being coupled to the gate of said silicon controlled rectifier, said storage control means further comprising (1) a doide having four successive zones of opposite conductivity types, the outer zones being the anode and cathode respectively, the anode of said diode being coupled to said first input terminal, and (2) first and second series-connected resistors, said second resistor being coupled to the cathode of said diode element and said first resistor being coupled to the first output and second input terminals of said storage control means, the junction between the said first and second resistors being coupled to the second output terminal of said storage control means, said storage control means causing current to flow into the gate of said silicon controlled rectifier when a signal having a first polarity is applied across said first and second input terminals and to cease flowing only when a signal having the opposite polarity is applied across said input terminals.

12. A switching circuit comprising (a) a silicon controlled rectifier having four successive zones of opposite conductivity types, the outer zones being the anode and cathode respectively and one of the intermediate zones being the gate, (b) an electroluminescent lamp connected across the anode and cathode of said silicon controlled rectifier, (c) resistor means coupling the junction of said electroluminescent lamp and the anode of said silicon controlled rectifier to one terminal of an alternating voltage source, the impedance of said resistor means being at least ten times the low-current level, non-avalanche state conductive anode-to-cathode impedance of said silicon controlled rectifier thereby preventing said silicon controlled rectifier from entering its avalanche state during conduction, and (d) storage control means having first and second output terminals and first and second input terminals, said first and second output terminals being coupled to the cathode and gate respectively of said silicon controlled rectifier and said second input terminal being coupled to the other terminal of said alternating voltage source, said storage control means causing current to flow into the gate of said silicon controlled rectifier when a signal having a first polarity is applied across said first and second input terminals and to cease flowing only when a signal having the opposite polarity is applied across said input terminals.

13. A switching circuit comprising (a) a first silicon controlled rectifier having four successive zones of opposite conductivity types, the outer zones being the anode and cathode respectively and one of the intermediate zones being the gate, (b) an electroluminescent lamp coupled in series with the anode-cathode circuit of said first silicon controlled rectifier and an alternating voltage source, the impedance of said electroluminescent lamp being at least ten times the low-current level, non-avalanche state conductive anode-to-cathode impedance of said first silicon controlled rectifier, thereby preventing said first silicon controlled rectifier from entering its avalanche state during conduction, and (c) storage control means having first and second output terminals, first and second input terminals and a direct voltage supply terminal, said supply terminal and said second input terminal being adapted for coupling a source of direct voltage therebetween, said first and second output terminals being coupled to the cathode and gate respectively of said first silicon controlled rectifier, said storage control means further comprising (1) a second silicon controlled rectifier having four successive zones of opposite conductivity types, the outer zones being the anode and cathode respectively and one of the intermediate zones being the gate, (2) resistive means coupling the anode and cathode of said second silicon controlled rectifier between said direct voltage supply and second input terminals respectively, (3) means coupling an outer zone of said second silicon controlled rectifier to the first output terminal of said storage control means, (4) means coupling said resistive means to the second output terminal of said storage control means, and (5) means coupling the gate and the adjacent outer zone of said second silicon controlled retifier to said first and second input terminals respectively, said storage control means causing current to flow into the gate of said first silicon controlled rectifier when a signal having a first polarity is applied across said first and second input terminals and to cease flowing only when a signal having the opposite polarity is applied across said input terminals.

References Cited

UNITED STATES PATENTS

| | | | |
|---|---|---|---|
| 3,060,345 | 10/1962 | Sack | 313—108 |
| 3,159,755 | 12/1964 | Duncan | 307—88.5 |
| 3,171,074 | 2/1965 | Momberg | 307—88.5 |
| 3,242,346 | 3/1966 | Skoubo | 307—88.5 |
| 3,246,162 | 4/1966 | Chin | 315—168 X |
| 3,254,267 | 5/1966 | Sack | 315—169 |

OTHER REFERENCES

General Electric SCR Manual, 3rd edition, copyright 1964, pp. 123–124.

Solid State Products, Inc. Bulletin D410–02, March 1960, pp. 6–7.

JOHN W. HUCKERT, *Primary Examiner.*

D. O. KRAFT, M. EDLOW, *Assistant Examiners.*